No. 860,488. PATENTED JULY 16, 1907.
A. KOONTZ.
BORING TOOL.
APPLICATION FILED MAY 9, 1906.

Inventor
Attin Koontz

Witnesses
Frank Hough
C. C. Hines

By Victor J. Evans
Attorney

THE NORRIS PETERS CO., WASHINGTON, D. C.

UNITED STATES PATENT OFFICE.

ALTIN KOONTZ, OF VERMILION, ILLINOIS.

BORING-TOOL.

No. 860,488.  Specification of Letters Patent.  Patented July 16, 1907.

Application filed May 9, 1906. Serial No. 315,899.

*To all whom it may concern:*

Be it known that I, ALTIN KOONTZ, a citizen of the United States of America, residing at Vermilion, in the county of Edgar and State of Illinois, have invented new and useful Improvements in Boring-Tools, of which the following is a specification.

This invention relates to a countersinking attachment for boring tools.

The object of the invention is to provide a simple and effective device by means of which a countersink may be formed simultaneously with the bore formed by the boring tool, thus enabling a bore or hole for the reception of a screw and a recess or countersink for the reception of the head of the screw to be made in a single operation.

Another object is to provide a device of this character which is adjustable to regulate the depth and size of the countersink as desired.

Figure 1:
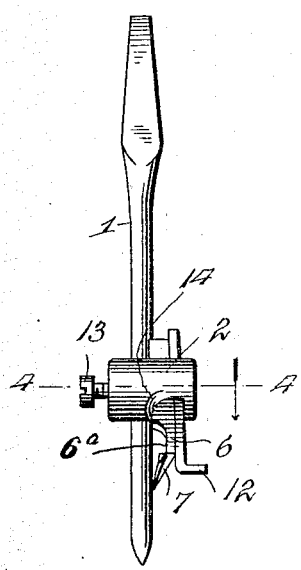
Figure 2:
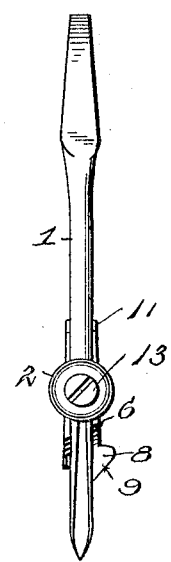
Figure 3:
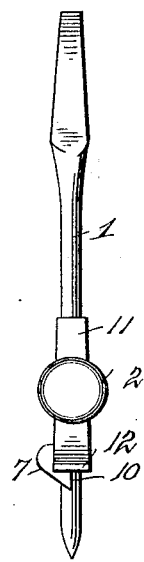
Figure 4:
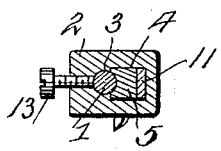
Figure 5:
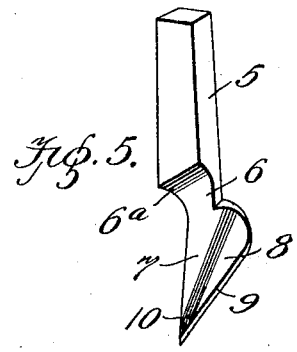

In the accompanying drawings,—Figure 1 is a front elevation of a boring tool embodying my invention. Figs. 2 and 3 are opposite side elevations of the same. Fig. 4 is a cross section on the line 4—4 of Fig. 1. Fig. 5 is a perspective view of the cutting tool.

Referring to the drawings, 1 designates a boring bit of any suitable type, upon which is arranged my improved countersink forming attachment. The attachment comprises a head 2, which is preferably cylindrical in form and extends transversely of the bit 1. The head is formed with a vertical passage or seat 3 corresponding approximately in contour to the cross sectional shape of the bit 1 and into which said bit fits, as shown in Fig. 4, and the head is also formed with a vertical slot 4 communicating at one side with said passage.

Extending through the slot 4 is a cutting tool 5, one side of which is recessed to bear against the adjacent side of the bit 1. The lower end of the body of the cutter is reduced to provide a short shank 6 which carries a cutting blade 7. This blade is obliquely arranged to the axis of the boring tool and is of segmental form and properly edged to cut a countersink of the desired size and depth at the top of the bore formed by the tool 1. It will be observed by reference to Figs. 2 and 3 that the blade is provided at its upper end with a laterally projecting wing 8, and that the forward cutting edge 9 inclines downwardly at an oblique angle from the wing to the point of the cutter at the junction of said cutting edge with the straight rear side 10 of the blade, the construction of the blade thus being such that the size of the countersink formed thereby will vary according to its depth of penetration. The concaved side of the blade faces the bit and its point bears against the same, and above the said concaved side of the blade the shank is cut away, as at $6^a$, to provide a clearance space between the same and the bit.

Extending through the slot 4 between the body of the cutting tool and adjacent end of the head 2 is a gage plate 11 provided at its lower end with an abutting member 12. This gage, like the cutting tool, is adjustable in the slot 4 and may be moved up or down to regulate the depth of the cut made by the bit 1 and the blade 7. A clamping screw 13 extends through the other end of the head and intersects the passage 3 and is adapted to bear upon the bit 1 to clamp the attachment in adjusted position thereon. When the screw is tightened, the head, cutter and gage are simultaneously clamped to the boring tool, as will be readily understood. The forward side of the head or that side immediately above the wing of the cutter is recessed or cut away to form a clearance space 14 for the free exit of the chips.

In operation, the attachment is properly adjusted on the bit and the latter actuated by hand or by a brace to form the screw-receiving opening in the work. After the opening has been formed to a prescribed depth the cutter 7 comes into action and forms the countersink for the head of the screw. By loosening the clamping screw 13 the cutter and gage may be adjusted to regulate the depth and size of the countersink and the depth of the bore or opening formed by the bit.

Having thus described the invention, what is claimed as new, is:—

In a countersinking device for boring tools, the combination, with a boring bit, of a head arranged transversely of the bit, said head being provided with a bit passage and a slot communicating therewith, a cutter having its shank portion fitted in said slot and bearing at one side against the bit, said cutter being provided with a segmental cutting blade arranged obliquely to the axis of the bit with its concaved side facing the bit and having a straight rear edge, a wing at the outer upper end thereof, and a front cutting edge inclining at an oblique angle from the wing to the point of the cutter at the junction of said cutting edge with the straight edge, the shank of the cutter being cut away above the concaved side of the blade to form a clearance passage between the same and the bit, a gage vertically adjustable in the slot and disposed between the outer end wall thereof and the cutter shank, said gage being provided at its lower end with a contact piece projecting laterally away from the outer convex side of the blade, and a screw mounted in the head and arranged to impinge against the bit to simultaneously clamp all the parts in adjusted position.

In testimony whereof, I affix my signature in presence of two witnesses.

ALTIN KOONTZ.

Witnesses:
  OLIVER M. WILKIN,
  ALBERT W. WILKIN.